3,030,351
COPPER COMPLEX COMPOUNDS OF
TRISAZO DYESTUFFS
Albert Demagistri, Binningen, near Basel, Hans Ischer, Basel, and Walter Wehrli, Riehen, near Basel, Switzerland, assignors to Sandoz A.G., Basel, Switzerland, a Swiss firm
No Drawing. Filed Feb. 17, 1959, Ser. No. 793,672
Claims priority, application Switzerland May 2, 1955
4 Claims. (Cl. 260—145)

The present application is a continuation-in-part of the application Ser. No. 580,978, filed April 27, 1956, and relates to copper containing polyazo dyestuffs of the formula

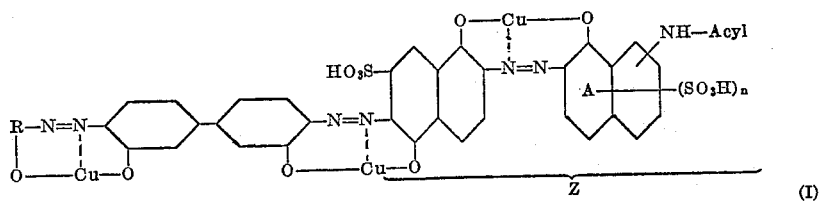

(I)

wherein R—O represents the radical Z or the radical of a coupling component of the hydroxybenzene, hydroxynaphthalene of 1-aryl-5-pyrazolone series coupled in ortho-position to —O—, in the nucleus A the azo grouping —N=N— stands in ortho-position to —O—. Acyl represents the radical of a saturated or unsaturated lower aliphatic mono- or dicarboxylic acid, benzoic acid and its derivatives, e.g. lower alkyl-, lower alkoxy-, chlorine-, bromine-, nitro- or sulfonic acid derivatives, cinnamic acid and its derivatives, phenylacetic acid, phthalic acids and their derivatives, 1-, or 2-naphthoic acid, furan-2-carboxylic acid or cyclohexanecarboxylic acid, and $n$ represents one of the integers 1 and 2, and whereby the dyestuff molecule contains at least three sulfonic acid groups.

The process for the production of the copper containing polyazo dyestuffs consists in coupling 1 mol of the tetrazo compound of 4.4'-diamino-3.3'-dimethoxy-1.1'-diphenyl in either order with 1 mol of a monoazo dyestuff, if desired in the form of its copper complex compound, having the general formula

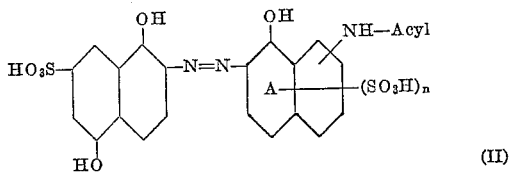

(II)

wherein $n$ and Acyl have the previously defined meaning, and with 1 mol of the same azo component or with 1 mol of a hydroxybenzene, a hydroxynaphthalene or a 1-aryl-5-pyrazolone coupling in ortho-position to a phenolic or enolic hydroxy group and treating subsequently the polyazo dyestuff so formed which must contain at least three sulfonic acid groups, in substance with a copper-yielding agent.

The monoazo dyestuffs of general Formula II employed in the coupling reaction are applied preferably in the form of their copper complex compounds. They may be coupled either in the first or second instance with the tetrazotized 4.4'-diamino-3.3'-dimethoxy-1.1'-diphenyl. The coupling components corresponding to the radical R—O are preferably monoazo dyestuffs if desired in the copperized or uncoppered form, of the Formula II, a hydroxybenzene, a hydroxynaphthalenemono-, di- or trisulfonic acid, a dihydroxynaphthalenesulfonic acid or a 1-aryl-5-pyrazolone which may be sulfonated in the aromatic nucleus. The coupling reactions are conducted in an alkaline, preferably soda alkaline, medium; the second coupling reaction may be carried out with the addition of pyridine or a mixture of pyridine bases.

The coppering of the new polyazo dyestuffs in substance is carried out in such a way as to cause splitting off any alkoxy groups which may be present in ortho-position to an azo group. Examples of suitable copper-yielding agents are copper sulfate, copper acetate and copper formate.

The dyestuffs can be coppered, for example, by heating with copper salts in a weakly acid to alkaline medium, if desired with pressure and/or in the presence of ammonia or organic bases, or in the suspension of an alkali metal salt of a low molecular aliphatic monocarboxylic acid.

The copper-containing polyazo dyestuffs dye cotton and fibers of regenerated cellulose in very level blue-gray to green-gray shades. The building-up properties on these fibers can easily be regulated by gradual addition of salts such as sodium sulfate, chloride or carbonate, or by mixtures of such salts. In other words, the dyestuffs possess excellent salt-controllability, by virtue of which level, well penetrated dyeings are obtained, e.g. on crosswound yarn packages, and shading with other dyestuffs is facilitated. The new dyestuffs also give penetrated dyeings on dead cotton.

The fastness properties obtained with the new dyestuffs are excellent. The dyeing on natural and regenerated cellulose fibers show very good fastness to light and to wet treatments such as washing, water, perspiration, sea water, wet pressing, water spotting, etc. In addition they are readily dischargeable and fast to scropping, formaldehyde, alkalis and acids. The new dyestuffs give a very good reserve of cellulose acetate, wool, silk, nylon, Perlon, acrylic and polyester fibers. They show no appreciable change of shade on aftertreatment with resin crease-resisting agents and the dyeings retain excellent light and wet fastness properties after such finishing. The fastness to gas fume fading is also very good. The dyestuffs are insensitive to lime and only very slightly sensitive to the metals iron, copper and chromium. The fastness properties can be further improved by aftertreating the dyeings with a polyalkylene-polyamine in presence of a copper salt or with a polyalkylene-polyamine containing copper in complex combination.

The following examples illustrate the invention. The parts and percentages specified therein are by weight and the temperatures are in degrees centigrade.

*Example 1*

24.4 parts of 4.4'-diamino-3.3'-dimethoxy-1.1'-diphenyl are suspended in 150 parts of water, 54 parts of concentrated hydrochloric acid and 150 parts of ice. A solution of 13.8 parts of sodium nitrite in 50 parts of water is added to the suspension at 0–2°. In order to prepare the diazomonoazo intermediate, the resultant tetrazo solution is run, at 0–5°, into a solution of 34.8 parts of sodium 1-hydroxynaphthalene-3.8-disulfonate in 50 parts of water. After the addition of a solution of 6 parts of sodium carbonate in 30 parts of water, coupling on one side to form the diazomonoazo compound takes place easily and quantitatively. For final coupling, there is added to the solution of the intermediate compound, at 5–10°, a solution of the copper complex compound from 61 parts of the monoazo compound of the formula

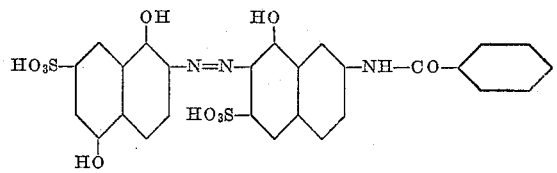

in 700 parts of pyridine and 700 parts of water, after which 100 parts of concentrated aqueous ammonia are added to the resultant mixture. Upon completion of the coupling, the obtained trisazo dyestuff is salted out of the solution and is filtered off.

For demethylating coppering of the trisazo dyestuff, the obtained filter cake is stirred into 4000 parts of water, 50 parts of diethanolamine are added to the suspension, and the latter then heated to 80°. At 80–90°, there is run thereinto, in the course of a half hour, a solution of 50 parts of crystalline copper sulfate and 70 parts of concentrated aqueous ammonia in 300 parts of water. As a result, the trisazo dyestuff goes into solution; the solution is then stirred for 20 hours at 95–97°. The copper-containing trisazo dyestuff which is thus formed is

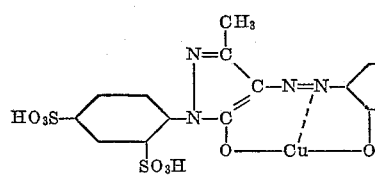

then salted out of the solution, filtered off and dried. It corresponds to the formula

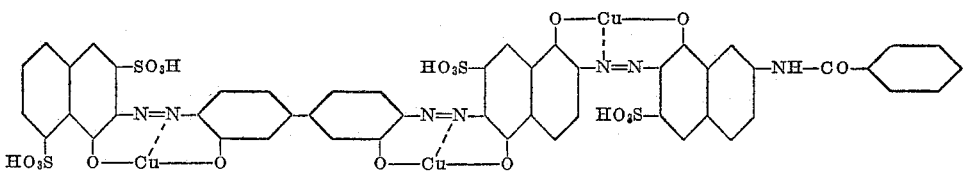

and is a dark powder which dissolves with blue coloration in water and with blue-green coloration in concentrated sulfuric acid, and dyes cotton and fibers of regenerated cellulose in fast blue-gray shades.

0.1 part of copper-containing trisazo dyestuff is dissolved in 300 parts of lime-free water. In the so-prepared bath, 10 parts of prewetted cotton fabric are dyed, the bath—beginning at a temperature of 30°—being heated to boiling in the course of 30 minutes and then being maintained in the vicinity of the boiling temperature for 15 minutes. 3 to 4 parts of sodium sulfate, in the form of a 10% aqueous solution, are added portionwise to the bath during the dyeing process. The dyed material is allowed to cool in the bath to 50° in the course of 15 to 20 minutes, after which it is withdrawn, washed with water, centrifuged and dried. After-treatment of the so-obtained dyed material, according to U.S. Patent No. 2,622,075 (Examples 7 and 11), with a cation-active copper complex compound, which may be basic in character, e.g. with a copper-containing polyalkylene polyamine, produces a distinct improvement in the fastness properties of the dyeing.

*Example 2*

31.7 parts of 4,4′-diamino-3,3′-dimethoxy-1,1′-diphenyl hydrochloride are stirred into a mixture of 250 parts of water, 35.5 parts of concentrated hydrochloric acid and 150 parts of ice. At 2°, there is added to the suspension a solution of 13.8 parts of sodium nitrite in 50 parts of water, and stirring continued until the tetrazotization is completed. To prepare the intermediate compound, there is added to the tetrazo solution at 5° a solution of the copper complex compound from 61 parts of the monoazo dyestuff of the formula

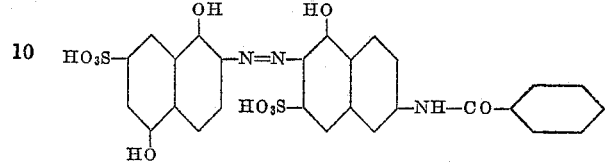

in 350 parts of water, 10 parts of 30% aqueous caustic soda solution and 50 parts of 20% aqueous sodium carbonate solution. Then 50 additional parts of 20% aqueous sodium carbonate solution are added to the coupling mixture. Coupling on one side takes place easily and quantitatively.

For final coupling, there is added to the mixture a solution of 33.4 parts of 1-phenyl-3-methyl-5-pyrazolone-2′,4′-disulfonic acid in 125 parts of water and 100 parts of 20% aqueous sodium carbonate solution. Upon completion of the coupling, the resultant trisazo dyestuff is salted out and is filtered off.

Demethylating coppering of the said trisazo dyestuff is carried out after manner described in Example 1. The so-obtained copper-containing trisazo dyestuff which corresponds to the formula

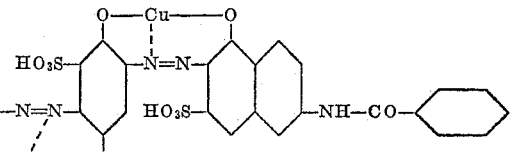

is a dark powder which dissolves with blue-green coloration in water and which dyes cotton and fibers of regenerated cellulose in fast green-gray shades.

The following table sets forth additional copper-containing polyazo dyestuffs which can be prepared according to the manner set forth in Examples 1 and 2. These additional dyestuffs possess, in the unmetallized state, the formula

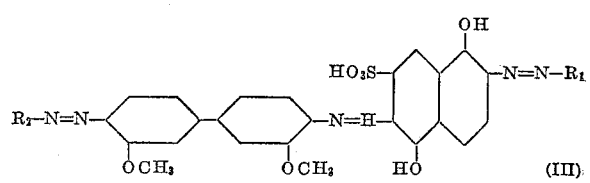

and are characterized in the table:
In column B by the Acyl amino-hydroxynaphthalene-mono- or di-sulfonic acid on which the azo component $R_1$ of Formula III is based;
In column C by the second azo component which forms the radical $R_2$; and
In column D by the shade of the copper-containing dyeing of the polyazo dyestuff on cotton.

| (A) Example No. | (B) R¹ = Radical of | (C) R² = Radical of | (D) Shade of the Copper-Containing Dyeing on Cotton |
|---|---|---|---|
| 3 | 1 - benzoylamino - 8 - hydroxynaphthalene - 3,6 - disulfonic acid | 1 - hydroxynaphthalene - 3,8 - disulfonic acid | Blue-gray. |
| 4 | 1 - benzoylamino - 8 - hydroxynaphthalene - 4 - sulfonic acid | do | Do. |
| 5 | 2 - acetylamino - 5 - hydroxynaphthalene - 7 - sulfonic acid | do | Greenish gray. |
| 6 | 2 - acetylamino - 5 - hydroxynaphthalene - 1,7 - disulfonic acid | do | Blue-gray. |
| 7 | 2 - benzoylamino - 5 - hydroxynaphthalene - 7 - sulfonic acid | 1 - hydroxynaphthalene - 3,6,8 - trisulfonic acid | Bluish gray. |
| 8 | 2 - naphthoyl - (1') - amino - 5 - hydroxynaphthalene - 7 - sulfonic acid | do | Blue gray. |
| 9 | 2 - cinnamoylamino - 5 - hydroxynaphthalene - 1,7 - disulfonic acid | 1 - hydroxynaphthalene - 4 - sulfonic acid | Do. |
| 10 | 2 - (2' - chloro) - benzoylamino - 5 - hydroxynaphthalene - 7 - sulfonic acid | 2 - hydroxynaphthalene - 3,6 - disulfonic acid | Do. |
| 11 | 2 - furoylamino - 5 - hydroxynaphthalene - 7 - sulfonic acid | 1 - hydroxynaphthalene - 3,6,8 - trisulfonic acid | Do. |
| 12 | 2 - (phenylacetyl) - amino - 5 - hydroxynaphthalene - 7 - sulfonic acid | 1 - hydroxynaphthalene - 3,8 - disulfonic acid | Gray. |
| 13 | 2 - phthalylamino - 5 - hydroxynaphthalene - 1,7 - disulfonic acid | 2 - hydroxynaphthalene - 4 - sulfonic acid | Reddish gray. |
| 14 | 2 - acetylamino - 5 - hydroxynaphthalene - 1,7 - disulfonic acid | Acetylacetone | Greenish gray. |
| 15 | 2 - maleicamino - 5 - hydroxynaphthalene - 7 - sulfonic acid | 1 - hydroxynaphthalene - 3,6 - disulfonic acid | Gray. |
| 16 | 2 - benzoylamino - 5 - hydroxynaphthalene - 7 - sulfonic acid | 1 - hydroxynaphthalene - 3,8 - disulfonic acid | Blue-gray. |
| 17 | 2 - acetylamino - 5 - hydroxynaphthalene - 1,7 - disulfonic acid | 2 - acetylamino - 5 - hydroxynaphthalene - 7 - sulfonic acid | Do. |
| 18 | 2 - benzoylamino - 8 - hydroxynaphthalene - 6 - sulfonic acid | 1,8 - dihydroxynaphthalene - 3,6 - disulfonic acid | Do. |
| 19 | 2 - cinnamoylamino - 5 - hydroxynaphthalene - 1,7 - disulfonic acid | 2 - phenylamino - 5 - hydroxynaphthalene - 7 - sulfonic acid | Reddish gray-blue. |
| 20 | 2 - (4' - methoxy - benzoyl)amino - 8 - hydroxynaphthalene - 6 - sulfonic acid | 1-hydroxynaphthalene-3,6-disulfonic acid | Gray-blue. |
| 21 | 2 - (3' - methyl - 4' - nitro)benzoylamino - 5 - hydroxynaphthalene - 7-sulfonic acid | 1-hydroxynaphthalene-3,6,8-trisulfonic acid | Greenish blue-gray. |
| 22 | 2-benzoylamino-5-hydroxynaphthalene-7-sulfonic acid | 1 - acetoacetylamino - benzene - 2,4 - disulfonic acid | Reddish gray. |
| 23 | do | 1-acetoacetylaminobenzene-4-sulfonic acid | Do. |
| 24 | do | 2-acetoacetylaminonaphthalene-7-sulfonic acid | Do. |
| 25 | do | 1 - naphthyl(2') - 3 - methyl - 5 - pyrazolone - 6'-sulfonic acid | Do. |
| 26 | 2-benzoylamino-8-hydroxynaphthalene-6-sulfonic acid | 1- phenyl - 3 - methyl - 5 - pyrazolone - 4' - sulfonic acid | Gray-blue. |
| 27 | 2-propionylamino-5-hydroxynapthalene-7-sulfonic acid | 1-phenyl-3-methyl-5-pyrazolone-3'-sulfonic acid | Gray. |
| 28 | 2-toluylamino-5-hydroxynaphthalene-7-sulfonic acid | do | Blue-gray. |
| 29 | 2-benzoylamino-5-hydroxynapthalene-1, 7-disulfonic acid | Barbituric acid | Reddish gray. |
| 30 | 1-benzoylamino-8-hydroxynaphthalene-3, 6-disulfonic acid | 1 - acetoacetylamino - benzene - 4 - sulfonic acid | Gray. |
| 31 | 2-benzoylamino-5-hydroxynaphthalene-7-sulfonic acid | 1 - phenyl - 3 - methyl - 5 - pyrazolone - 2'-sulfonic acid | Reddish gray. |
| 32 | do | 1-phenyl-5-pyrazolone-3-carboxylic-acid | Do. |
| 33 | 2-[3'-nitrophthalyl]-amino-5-hydroxynaphthalene-7-sulfonic acid | 1 - phenyl - 3 - methyl - 5 - pyrazolone - 3'-carboxylic acid | Gray. |
| 34 | 2,acetylamino-5-hydroxynaphthalene-7-sulfonic acid | 1, 5-dihydroxy-2-(2'-acetylamino-5'-hydroxy)-naphthyl (6')-azonaphthalene-7, 7'-disulfonic acid | Do. |
| 35 | 2-acetylamino-5-hydroxynaphthalene-7-sulfonic acid | 1, 5-dihydroxy-2-(2'-methylamino-5'-hydroxy) naphthyl (6')-azonaphthalene-7, 7'-disulfonic acid | Blue-gray. |
| 36 | 2-[3'-ethoxybenzoyl] amino - 5 - hydroxynaphthalene -7 - sulfonic acid | 1, 5-dihydroxy-2-(2'-benzoylamino-5'-hydroxy) naphthyl (6')-azonaphthalene-7, 7'-disulfonic acid | DO. |
| 37 | do | 1, 5-dihydroxy-2-(2'-amino-5'-hydroxy)-naphthyl (6')-azo-naphthalene-7, 7'-disulfonic acid | Gray. |
| 38 | 2-naphthoyl (2')-amino-5-hydroxynaphthalene-7-disulfonic acid | do | Do. |
| 39 | 2 - cyclohexane - carboxylamino - 5 - hydroxynaphthalene - 7 - sulfonic acid | 1, 5-dihydroxy-2-(2'-phenylamino-5'-hydroxy) naphthyl (6')-azonaphthalene-7, 1', 7'-trisulfonic acid | Do. |
| 40 | 2-[3'-nitro-cinnamoyl]-amino-8-hydroxynaphthalene-3, 6 - disulfonic acid | 1, 5-dihydroxy-2-(2'-methylamino-5'-hydroxy) naphthyl (6')-azonapthalene-7, 7'-disulfonic acid | Do. |
| 41 | 1-benzoylamino-8-hydroxynaphthalene-3,6-disulfonic acid | do | Do. |
| 42 | do | 1, 5-dihydroxy-2-(1'-benzoylamino-8'-hydroxy) naphthyl (7')-azonaphthalene-7, 3', 6'-trisulfonic acid | Do. |
| 43 | 1-benzoylamino-8-hydroxynaphthalene-4-sulfonic acid | 1, 5-dihydroxy-2-(2' - propionylamino-5' - hydroxy) -naphthyl (6') -azonaphthalene-7, 1', 7'-trisulfonic acid | Do. |
| 44 | 2-naphthoyl (1')-amino-5-hydroxynaphthalene-7-sulfonic acid | do | Do. |
| 45 | 2-benzoylamino-5-hydroxynaphthalene-1, 7-disulfonic acid | 1, 5-dihydroxy-2-(2'-benzoylamino-5'-hydroxy) naphthyl (6') -azonapthalene-7, 1', 7'-trisulfonic acid | Do. |
| 46 | 2-acetylamino-5-hydroxynaphthalene-7-sulfonic acid | do | Do. |
| 47 | 2-valerylamino-5-hydroxynaphthalene-7,3'-disulfonic acid | do | Do. |
| 48 | 2-isovalerylamino-5-hydroxynaphthalene-7-sulfonic acid | do | Do. |
| 49 | 2-[3'-sulfobenzoyl]-amino-5-hydroxynaphthalene-7-sulfonic acid | do | Do. |
| 50 | 2-acrylamino-5-hydroxynaphthalene-7,3'-disulfonic acid | do | Do. |
| 51 | 2-sulfoacetylamino-5-hydroxynaphthalene-7-sulfonic acid | Acetoacetylamino-octane | Do. |
| 52 | do | 4-hydroxy-1-methylbenzene | Do. |
| 53 | do | 2-hydroxynaphthalene | Do. |
| 54 | 2-acetylamino-5-hydroxynaphthalene-1,7-disulfonic acid | 2-hydroxy-5,6,7,8-tetrahydronaphthalene | Do. |
| 55 | do | 1,3-dihydroxybenzene | Do. |
| 56 | 2-benzoylamino-8-hydroxynaphthalene-6-sulfonic acid | 2 - cinnamoylamino - 5 - hydroxynaphthalene - 1,7-disulfonic acid | Do. |
| 57 | do | 2 - furoylamino - 5 - hydroxynaphthalene - 7 - sulfonic acid | Do. |
| 58 | 2-benzoylamino-5-hydroxynaphthalene-7-sulfonic acid | 2 - benzoylamino - 5 - hydroxynaphthalene - 7 - sulfonic acid | Do. |
| 59 | do | 2 - (2' - carboxy) - benzoylamino - 5 - hydroxy - naphthalene-7-sulfonic acid. | Do. |
| 60 | 2-acetylamino-5-hydroxynaphthalene-1,7-disulfonic acid | 2 - naphthoyl(1') - amino - 5 - hydroxynaphthalene-7-sulfonic acid | Do. |
| 61 | do | 2 - benzoylamino - 8 - hydroxynaphthalene - 6 - sulfonic acid | Do. |
| 62 | do | 1 - benzoylamino - 8 - hydroxynaphthalene - 4 - sulfonic acid | Do. |
| 63 | 2-benzoylamino-5-hydroxynaphthalene-7-sulfonic acid | 2 - carbethoxyamino - 5 - hydroxynaphthalene-7 - sulfonic acid | Do. |
| 64 | do | 2 - carbo - (2' - ethoxy) - ethoxyamino - 5 - hydroxyamino-naphthalene-7-sulfonic acid. | Do. |
| 65 | 2-benzoylamino-5-hydroxynaphthalene-1,7-disulfonic acid | 2 - carbobutoxyamino - 8 - hydroxynaphthalene-6-sulfonic acid. | Do. |

| (A) Example No. | (B) R¹= Radical of | (C) R²= Radical of | (D) Shade of the Copper-Containing Dyeing on Cotton |
|---|---|---|---|
| 66 | 2-acetylamino-5-hydroxynaphthalene-7-sulfonic acid | 2 - amino - 5 - hydroxynaphthalene - 7 - sulfonic acid. | Gray. |
| 67 | 2-acetylamino-5-hydroxynaphthalene-1,7-disulfonic acid | 2 - phenylureido - 5 - hydroxynaphthalene - 5 - sulfonic acid. | Do. |
| 68 | ----do---- | 2 - (4' - acetylamino) - phenylureido - 5 - hydroxynaphthalene-7-sulfonic acid. | Do. |
| 69 | ----do---- | 2 - (3' - aminosulfonyl) - phenylureido - 5 - hydroxynaphthalene-7-sulfonic acid. | Do. |
| 70 | 2-acetylamino-8-hydroxynaphthalene-6-sulfonic acid | 2 - (3' - carboxy - 4' - hydroxy) - phenylureido - 5-hydroxynaphthalene-7-sulfonic acid. | Do. |
| 71 | ----do---- | 2 - (3' - carboxy - 4' - hydroxy - 5' - sulfo)-phenylureido-8-hydroxynaphthalene-6-sulfonic acid. | Do. |
| 72 | 2-benzoylamino-5-hydroxynaphthalene-7-sulfonic acid | 2 - ethylureido - 5 - hydroxynaphthalene - 7 - sulfonic acid | Do. |
| 73 | ----do---- | 2 - isoamylureido - 5 - hydroxynaphtahlene - 7 - sulfonic acid | Do. |
| 74 | ----do---- | 2 - di - (2' - hydroxy) - ethylureido - 5 - hydroxynaphthalene-7-sulfonic acid | Do. |
| 75 | ----do---- | 2 - cyclohexylureido - 5 - hydroxynaphthalene - 1,7-disulfonic acid | Do. |
| 76 | 2-acetylamino-5-hydroxynaphthalene-7-sulfonic acid | 2 - cyclohexylamino - 5 - hydroxynaphthalene - 7-sulfonic acid. | Do. |
| 77 | ----do---- | 2 - benzoylamino - 5 - hydroxynaphthalene - 7 - sulfonic acid | Do. |
| 78 | 2-benzoylamino-8-hydroxynaphthalene-6-sulfonic acid | 2 - methylamino - 5 - hydroxynaphthalene - 7 - sulfonic acid | Do. |
| 79 | ----do---- | 2-phenylamino - 5 - hydroxynaphthalene - 7,3'-disulfonic acid | Do. |
| 80 | 1-acetylamino-8-hydroxynaphthalene-4-sulfonic acid | 2-hydroxynaphthalene-4-sulfonic acid | Do. |
| 81 | ----do---- | 1-hydroxynaphthalene-3,8-disulfonic acid | Do. |
| 82 | 1-maleicamino-8-hydroxynaphthalene-3,6-disulfonic acid | 1 - phenyl - 3 - methyl - 5 - pyrazolone - 4' - sulfonic acid | Do. |
| 83 | 2-oxalylamino-5-hydroxynaphthalene-7-sulfonic acid | 1-hydroxynaphthalene-3,8-disulfonic acid | Do. |
| 84 | 2-isophthalylamino-8-hydroxynaphthalene-6-sulfonic acid | ----do---- | Do. |
| 85 | 2-terephthalylamino-5-hydroxynaphthalene-7-sulfonic acid | ----do---- | Do. |
| 86 | 2-nitrophthalylamino-5-hydroxynaphthalene-7-sulfonic acid | 1-hydroxynaphthalene-3,6,8-trisulfonic acid | Do. |
| 87 | 1 - (4' - bromobenzoyl) - amino - 8 - hydroxynaphthalene - 3,6 - disulfonic acid | 2-hydroxynaphthalene-4-sulfonic acid | Do. |

Formulae of representative dyestuffs of the foregoing examples are as follows:

*Example 4*

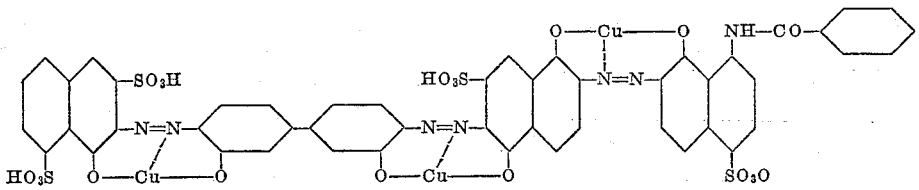

*Example 5*

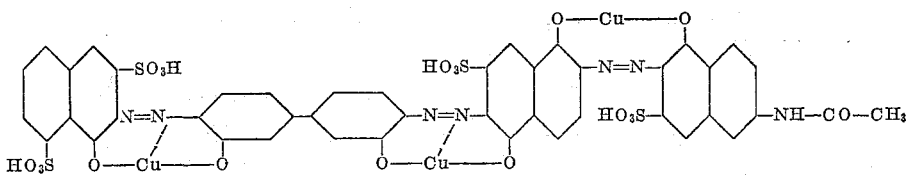

*Example 80*

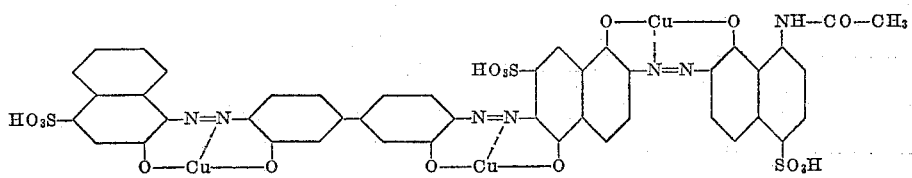

*Example 81*

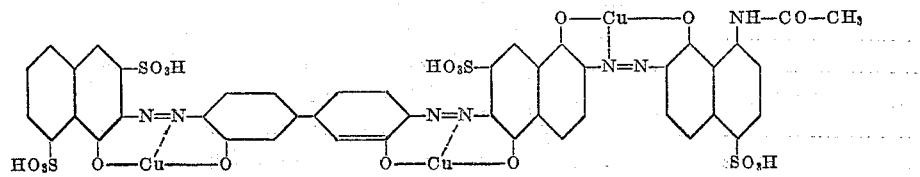

*Example 82*

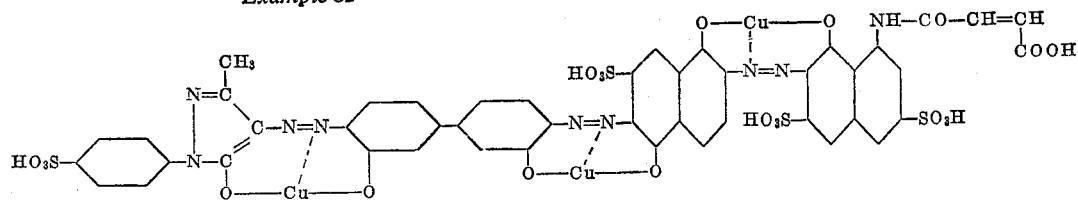

Having thus disclosed the invention what is claimed is:
1. A dyestuff of the formula

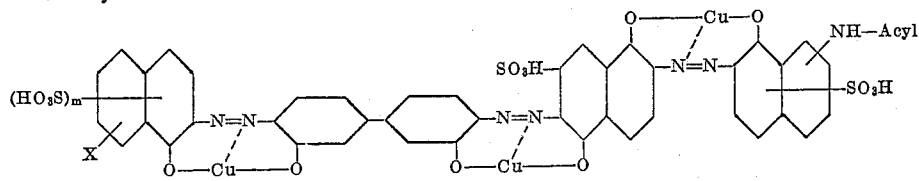

wherein m is an integer ranging from 1 to 2, Acyl is a member selected from the group consisting of the radicals of unsubstituted benzene mono- and di-carboxylic acids and substituted benzene mono- and di-carboxylic acids, the substituents of which are selected from the group consisting of chloro, bromo, methoxy, ethoxy, methyl, nitro and sulfo, and X is a member selected from the group consisting of hydrogen and hydroxy.

2. The copper complex dyestuff which corresponds to the formula

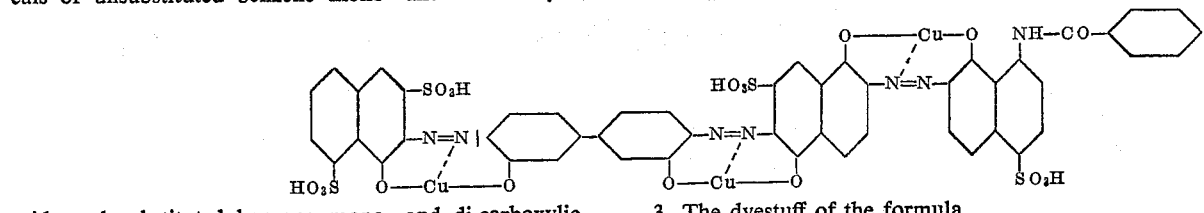

3. The dyestuff of the formula

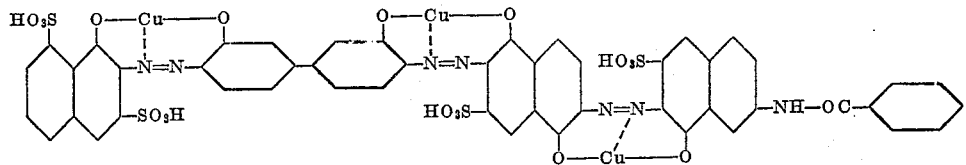

4. The dyestuff of the formula

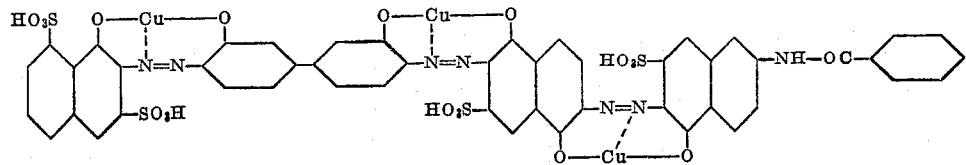

References Cited in the file of this patent
UNITED STATES PATENTS
2,644,813    Ruckstuhl _____ July 7, 1953

UNITED STATES PATENT OFFICE
CERTIFICATE OF CORRECTION

Patent No. 3,030,351                                    April 17, 1962

Albert Demagistri et al.

It is hereby certified that error appears in the above numbered patent requiring correction and that the said Letters Patent should read as corrected below.

Column 1, line 29, for "of" read -- or --; column 2, line 44, for "scropping" read -- scrooping --; column 3, line 27, for "amomnia" read -- ammonia --; columns 5 and 6, in the table, under the heading (B), Item 31, for "2,benzoylamino-" read -- 2-benzoylamino- --; same table, columns 7 and 8, under the heading (C), Item 73, for "-hydroxynaphtahlene-" read -- -hydroxynaphthalene- --; same columns 7 and 8, Example 4, lower right-hand portion of the formula, for

same columns, Example 81, the central moiety of the formula should appear as shown below instead of as in the patent:

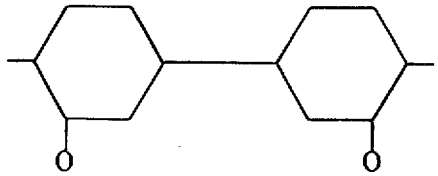

columns 9 and 10, claim 2, left-hand portion of the formula, for "-N=N|" read -- -N=N- --.

Signed and sealed this 6th day of November 1962.

(SEAL)
Attest:

ERNEST W. SWIDER                                          DAVID L. LADD
Attesting Officer                                    Commissioner of Patents